G. R. TAYLOR.
APPARATUS FOR BENDING CARDBOARD.
APPLICATION FILED FEB. 7, 1910.

999,909.

Patented Aug. 8, 1911.
4 SHEETS—SHEET 1.

Witnesses:—
W. P. Burke
John A. Percival

Inventor:—
George Rowland Taylor
By his Attorney:—

G. R. TAYLOR.
APPARATUS FOR BENDING CARDBOARD.
APPLICATION FILED FEB. 7, 1910.

999,909.

Patented Aug. 8, 1911.
4 SHEETS—SHEET 3.

Witnesses:-
W. P. Burke
John A. Percival

Inventor:-
George Rowland Taylor
By his Attorney:-

G. R. TAYLOR.
APPARATUS FOR BENDING CARDBOARD.
APPLICATION FILED FEB. 7, 1910.

999,909.

Patented Aug. 8, 1911.
4 SHEETS—SHEET 4.

Witnesses:-
John C. Sanders
John A. Prewal

Inventor:-
George Rowland Taylor
By his Attorney:-

COLUMBIA PLANOGRAPH CO., WASHINGTON, D. C.

UNITED STATES PATENT OFFICE.

GEORGE ROWLAND TAYLOR, OF BLACKPOOL, ENGLAND.

APPARATUS FOR BENDING CARDBOARD.

999,909. Specification of Letters Patent. Patented Aug. 8, 1911.

Application filed February 7, 1910. Serial No. 542,548.

*To all whom it may concern:*

Be it known that I, GEORGE ROWLAND TAYLOR, a subject of the King of Great Britain and Ireland, and resident of Blackpool, England, have invented certain new and useful Improvements in Apparatus for Bending Cardboard, of which the following is a specification.

This invention relates to and consists of improvements in apparatus for bending cardboard and the like which permit of the material operated upon, being bent simultaneously at two or more points in a parallel direction by a series of beveled edge disks or runners arranged at an oblique angle to the vertical and in an oblique converging angle to the direction in which the material being operated upon travels.

The object of the present invention is to enable the bending to be more perfectly and more expeditiously performed and to allow even boards of low grade quality to be operated upon without injury.

According to the invention I preferably employ six pairs of disks or runners in two parallel series of three sets or pairs each. These disks are free to rotate, and are mounted upon brackets which are suitably adjustable; the said disks are further arranged so as to operate at different angles to each other and to the plane of the bend and to the board operated upon, some being arranged at an oblique converging angle to the plane of the bend, while some are at an angle to the board operated upon and parallel to the plane of the bend.

Figure 1:
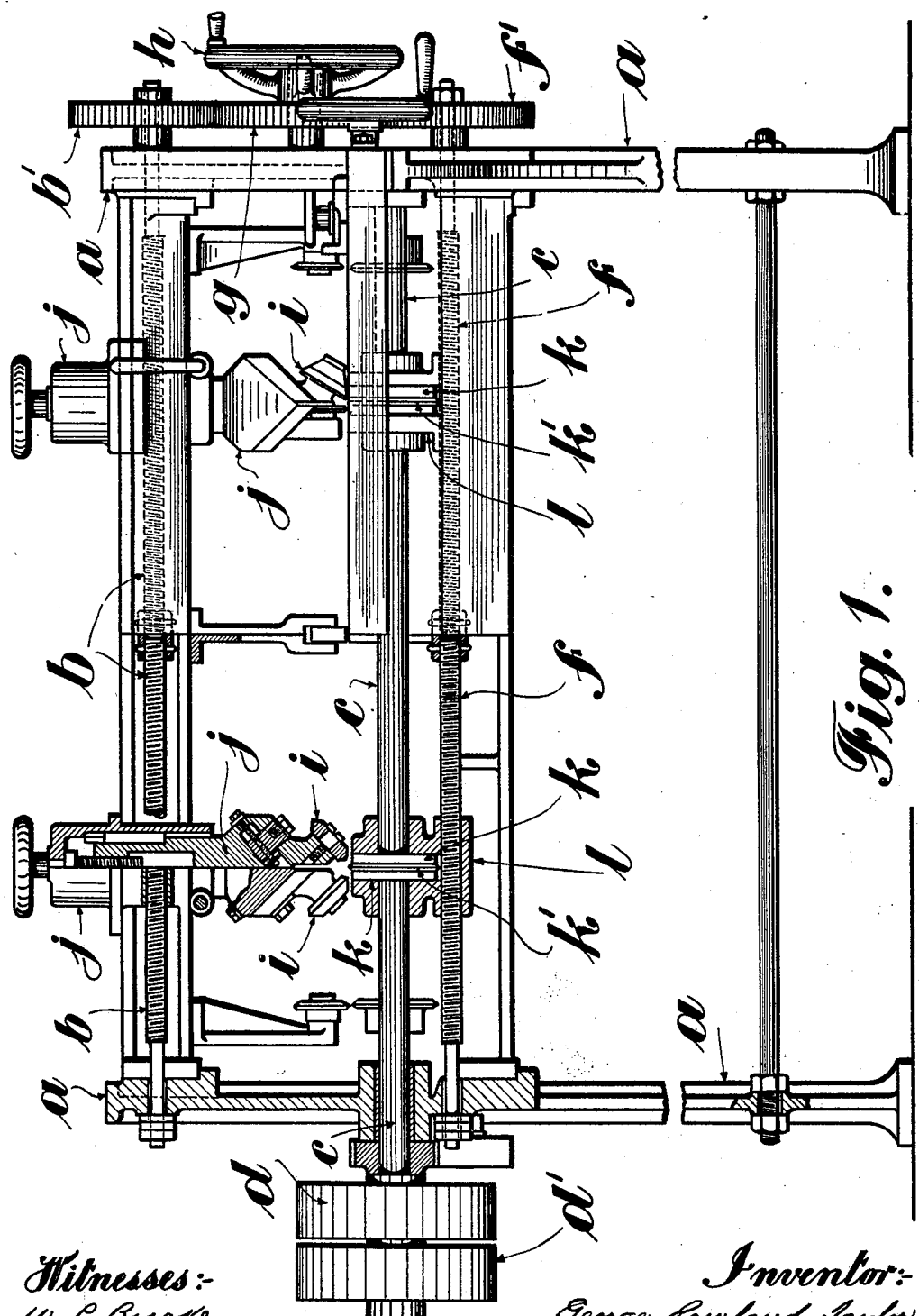
Figure 2:
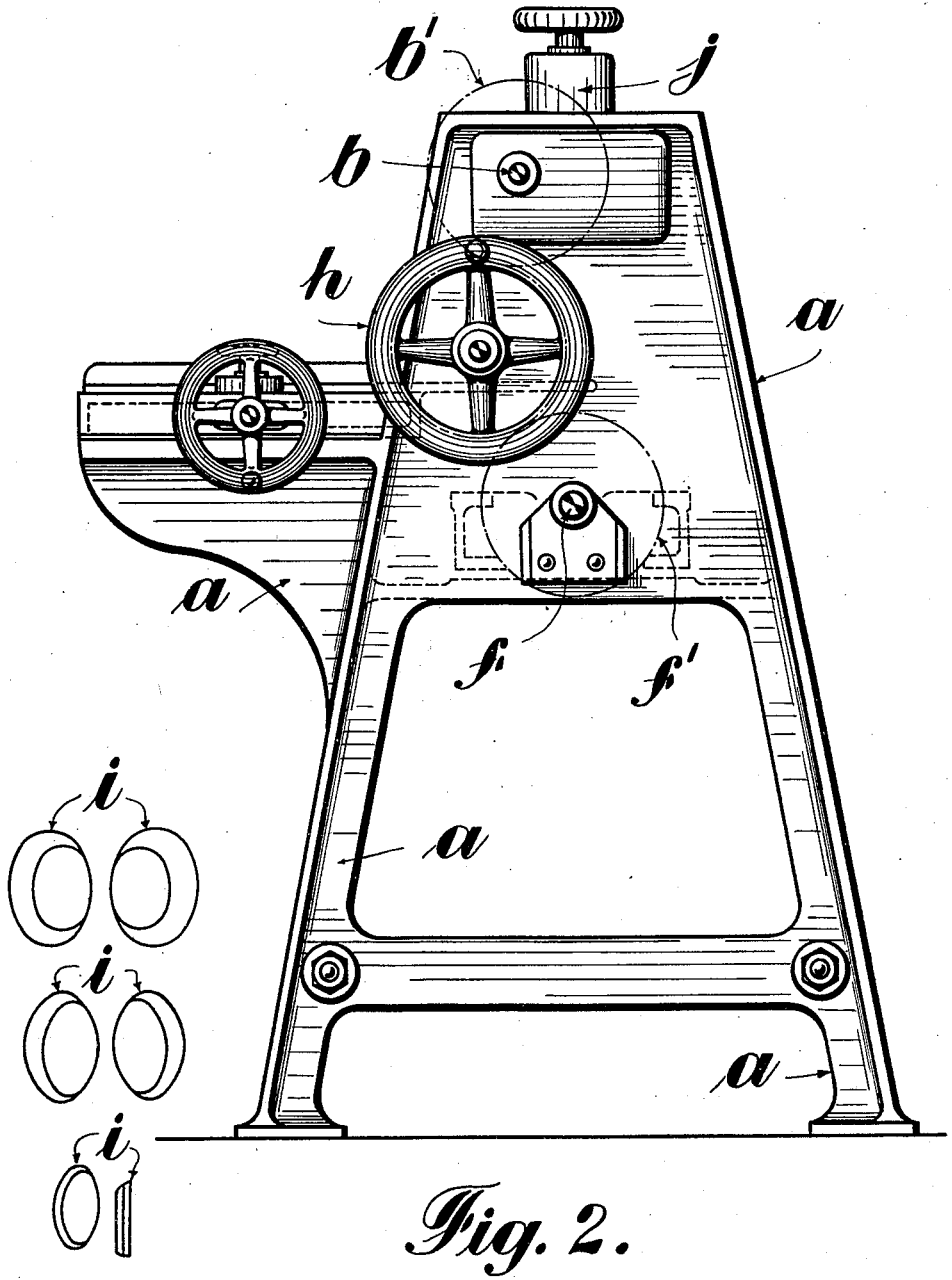
Figure 3:
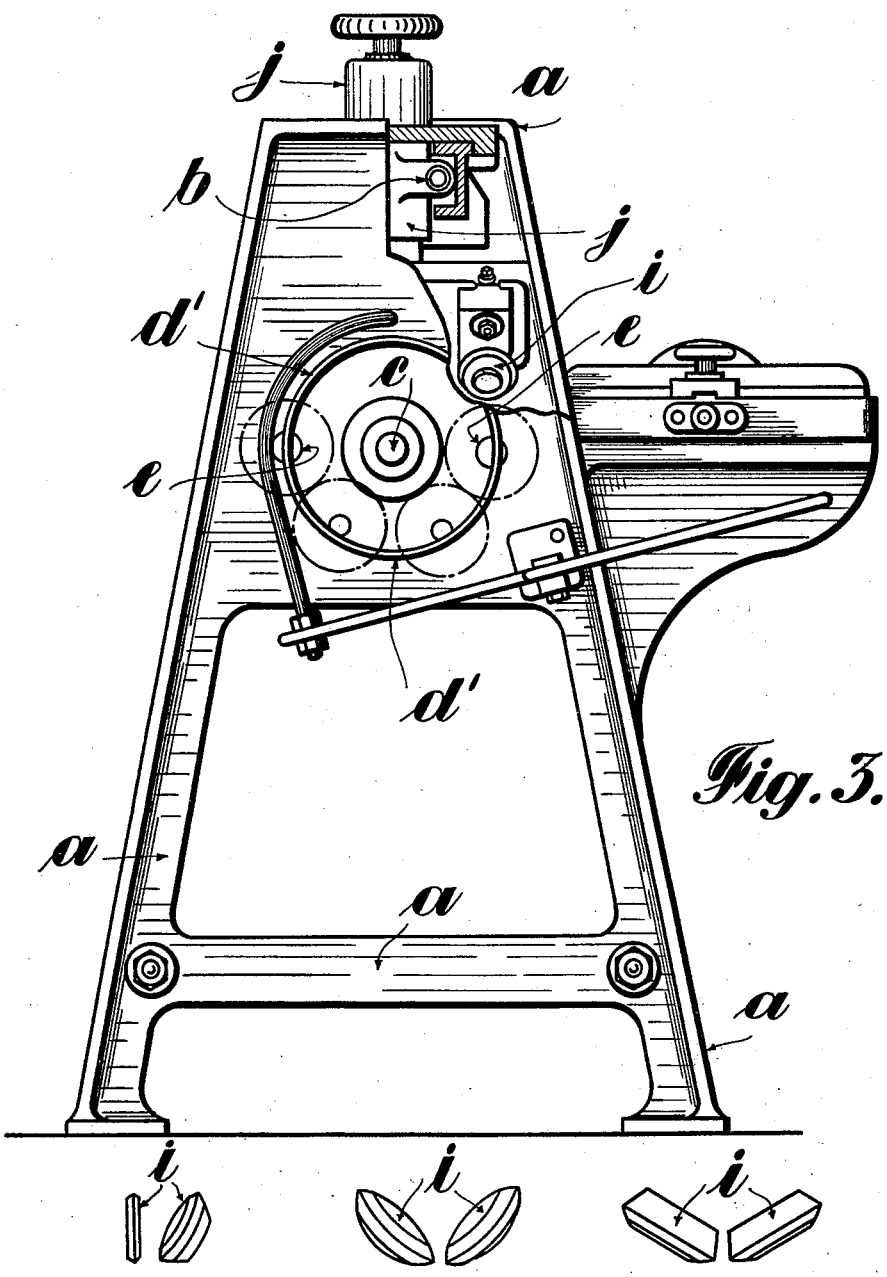
Figures 4, 5, 6:
Figure 8:
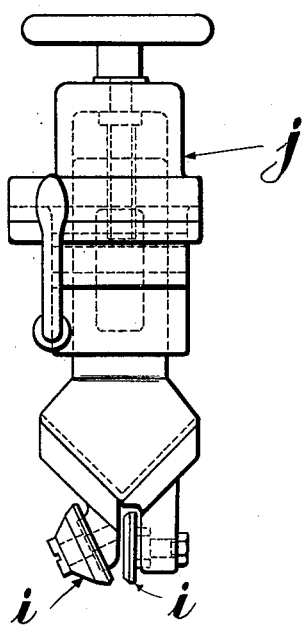
Figure 9:
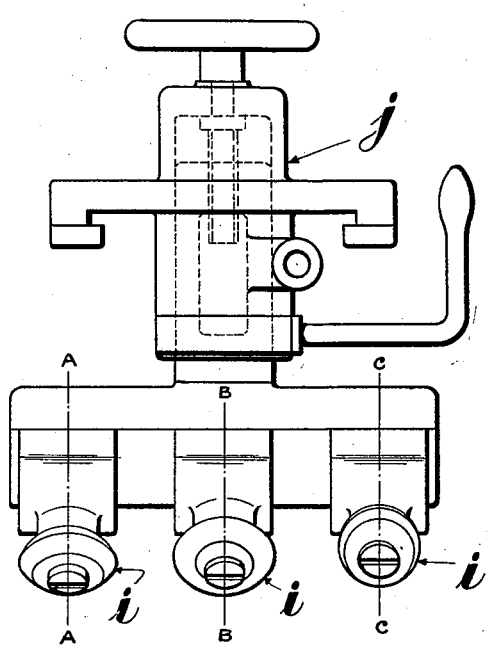
Figure 10:
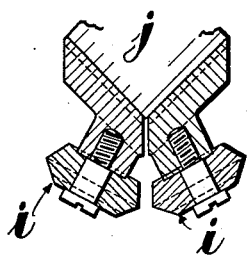
Figure 11:
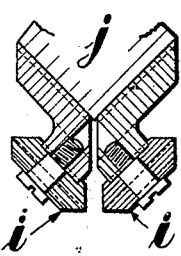
Figure 12:
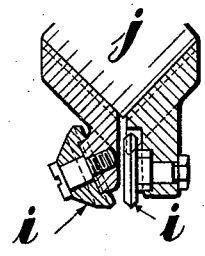

Upon the accompanying drawing Figure 1 illustrates a front elevation of a machine embodying the improvements and as adapted for producing one or two bends, portions of the machine being shown in section. Fig. 2 illustrates a right hand end view, and Fig. 3 a left hand end view. Figs. 4, 5 and 6 illustrate front views of the several pairs of disks or runners of one set, and Fig. 7 illustrates a plan of the two sets of runners. Fig. 8 illustrates a front view, and Fig. 9 a side view of one of the brackets, while Figs. 10, 11, and 12 illustrate sectional views of the disks on lines A—A, B—B, and C—C respectively.

Referring to the drawings, the machine comprises end frames $a$, $a$ which support at their upper extremities a right-and-left hand screw-threaded shaft or spindle $b$, a main driving shaft $c$ upon one end of which are mounted the fast and loose pulleys $d$, $d$ and two further shafts $e$, $e$ arranged parallel with, and which through suitable gearing, are driven from, the main shaft $c$. Below these shafts is a further right and left hand screw-threaded shaft or spindle $f$. This shaft $f$ and also the shaft $b$ are respectively provided with toothed wheels $f'$ $b'$, which mesh with a wheel $g$ operated by a hand wheel $h$, see Fig. 1.

$i$, $i$ are the disks or runners mounted upon or in brackets $j$, $j$ carried by the shaft $b$ and which are arranged in two parallel series of three sets or pairs each, one pair behind another, tandem-fashion in each series. By means of the hand wheel and gear wheels $b$, $b$ $g$ the shaft $b$ may be turned to permit of the brackets $j$ being moved toward or away from each other to allow for different widths of boards being treated.

The arrangement of the disks is shown diagrammatically in Figs. 4, 5, 6 and 7 and consists in mounting the outer disk of the first pair of each series at an oblique converging angle, that is at an angle both to the board and to the plane of the bend, the inner disk of the corresponding pair being vertical, or in other words at right angles to the board and parallel to the plane of the bend and slightly in advance of the outer one, see Fig. 7 so that it may come into operation slightly in advance of the outer one. The second pair of disks in each series are mounted at an oblique converging angle, such angle being at a greater degree from the vertical but less from the vertical of the bend than the angles of those of the outer disks of the last mentioned or first pair. The third pair of each series are arranged at an angle of still greater degree from the vertical, but are preferably parallel to the plane of the bend, or oblique only to a slight degree. All the several disks are formed to conform to the requirements of their respective positions in the series but are each approximately V-shaped upon the periphery.

Mounted upon the shafts $c$, $e$, $e$ are the collars $k$, $k$, $k$ each of which is formed with an appropriately shaped annular ridge $k'$ which lies at a point intermediate between the disks $i$, $i$ of each set, such collars $k$ being arranged one for each pair of disks $i$. The collars are preferably mounted on a key on their respective shafts and the longitudinal adjustment is effected by means of the hand wheel $h$ and wheels $f$ $g$, the collars $k$, $k$ being arranged to rotate within brackets $l$, $l$ mounted on the shaft $f$ aforesaid. As shown the shafts $c$, $e$, $e$ and collars $k$, $k$, $k$ are positively driven, but if desired, the collars alone may be positively driven.

What I claim is:—

1. In a machine for bending cardboard and the like, a series of not less than three pairs of rotary bevel-edged disks arranged one pair behind another and the disks of each pair arranged at different angles to a horizontal plane than the next pair, the angle increasing with each pair of disks starting from the foremost pair, and said pairs of disks also arranged at different converging angles to a vertical plane central to the several pairs of disks, in combination with a series of rotary collars one arranged below each pair of disks and each collar having an annular ridge on its periphery lying central to the disks and means for rotating the collars, substantially as herein set forth.

2. In a machine for bending cardboard and the like two sets of not less than three pairs of rotary bevel-edged disks, arranged at a distance apart equal to the distance desired between two parallel bends and the disks of each set arranged one pair behind another and the disks of each pair arranged at different angles to a horizontal plane than the next pair, the angle increasing with each pair of disks starting from the foremost pair, and said pairs of disks also arranged at different converging angles to a vertical plane central to the several pairs of disks of each set, in combination with a series of rotary collars for each set of disks, one arranged below each pair of disks and each collar having an annular ridge on its periphery lying central to the disks above it, and means for rotating the collars, substantially as herein set forth.

3. A machine for bending cardboard and the like comprising in combination two end frames, means for securing one to the other, a series of shafts supported in the end frames, collars on such shafts having annular ridges right and left handed screwed spindles below such shafts and a nut on each spindle designed on the screw being rotated to traverse the collar along its shaft, a table for supporting the cardboard and guiding it on to the collars, brackets above the collars, further right and left handed screwed spindles on which the brackets are mounted, means by which the motion of the collar adjusting spindles is imparted to the bracket adjusting spindles, a set of three pairs of rotary bevel-edged disks carried by each bracket and means for adjusting the distance between the disks of each pair, further means for collectively adjusting each set of disks toward and away from the collars, and means for locking the brackets in set positions upon their screwed spindles, substantially as herein set forth.

In witness whereof I have hereunto set my hand in the presence of two witnesses.

GEORGE ROWLAND TAYLOR.

Witnesses:
F. C. PENNINGTON,
JOHN CAMP.

---

Copies of this patent may be obtained for five cents each, by addressing the "Commissioner of Patents, Washington, D. C."